United States Patent
King

(10) Patent No.: US 6,317,831 B1
(45) Date of Patent: Nov. 13, 2001

(54) METHOD AND APPARATUS FOR ESTABLISHING A SECURE CONNECTION OVER A ONE-WAY DATA PATH

(75) Inventor: Peter F. King, Half Moon Bay, CA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 09/158,317

(22) Filed: Sep. 21, 1998

(51) Int. Cl.$^7$ ................................. H04L 9/08; H04L 9/16
(52) U.S. Cl. ..................... 713/171; 713/151; 713/181; 380/223; 380/260; 380/262
(58) Field of Search ..................... 713/151, 170, 713/171, 176, 181; 380/223, 239, 257, 260, 262, 263, 270, 273; 455/3.1, 3.2, 6.1, 410, 411, 450, 509

(56) References Cited

U.S. PATENT DOCUMENTS

| 5,657,390 | * | 8/1997 | Elgamal et al. | 380/49 |
| 6,138,158 | | 10/2000 | Boyle et al. | 709/225 |

FOREIGN PATENT DOCUMENTS

| 0 704 785 A2 | * | 4/1996 | (EP) | G06F/1/00 |
| 2 304 499 A | * | 3/1997 | (GB) | H04B/7/185 |

OTHER PUBLICATIONS

R. Jain et al., "Wireless Internetworking Architectures to Support Mobile IP over ATM," in Global Telecommunications Conference, 1997. GLO '97., IEEE, Nov. 8, 1997, pp. 1866–1870.*

"HDTP Draft Specification", Version 1.1, Unwired Planet, Inc. 1997.

"Wireless Application Protocol Wireless Transport Layer Security" (WAP WTLS), Wireless Application Forum, Apr. 30, 1998.

"Magellan SUGP Protocol" Draft Specification, Unwired Planet, Inc. 1997.

"Wireless Application Protocol Wireless Session Protocol Specification" (WAP WSP), Version 30, Apr. 1998.

* cited by examiner

Primary Examiner—Gail Hayes
Assistant Examiner—Justin T. Darrow
(74) Attorney, Agent, or Firm—Beyer Weaver & Thomas, LLP

(57) ABSTRACT

Improved techniques for facilitating secure data transfer over one-way data channels or narrowband channels are disclosed. Often, these channels are wireless channels provided by wireless data networks. The techniques enable cryptographic handshake operations for a one-way data channel to be performed over a companion two-way data channel so that the one-way data channel is able to effectively satisfy security protocols that require two-way communications for the cryptographic handshake operations. Once the cryptographic handshake operations are complete, data can be transmitted over the one-way data channel in a secure manner. Additionally, the techniques also enable the cryptographic handshake operations to be performed more rapidly because the two-way channel is typically a wideband channel. In which case, the use of a wideband channel instead of a narrowband channel for the cryptographic handshake operations results in latency reductions, regardless of whether the narrowband channel is a one-way channel or a two-way channel.

32 Claims, 12 Drawing Sheets

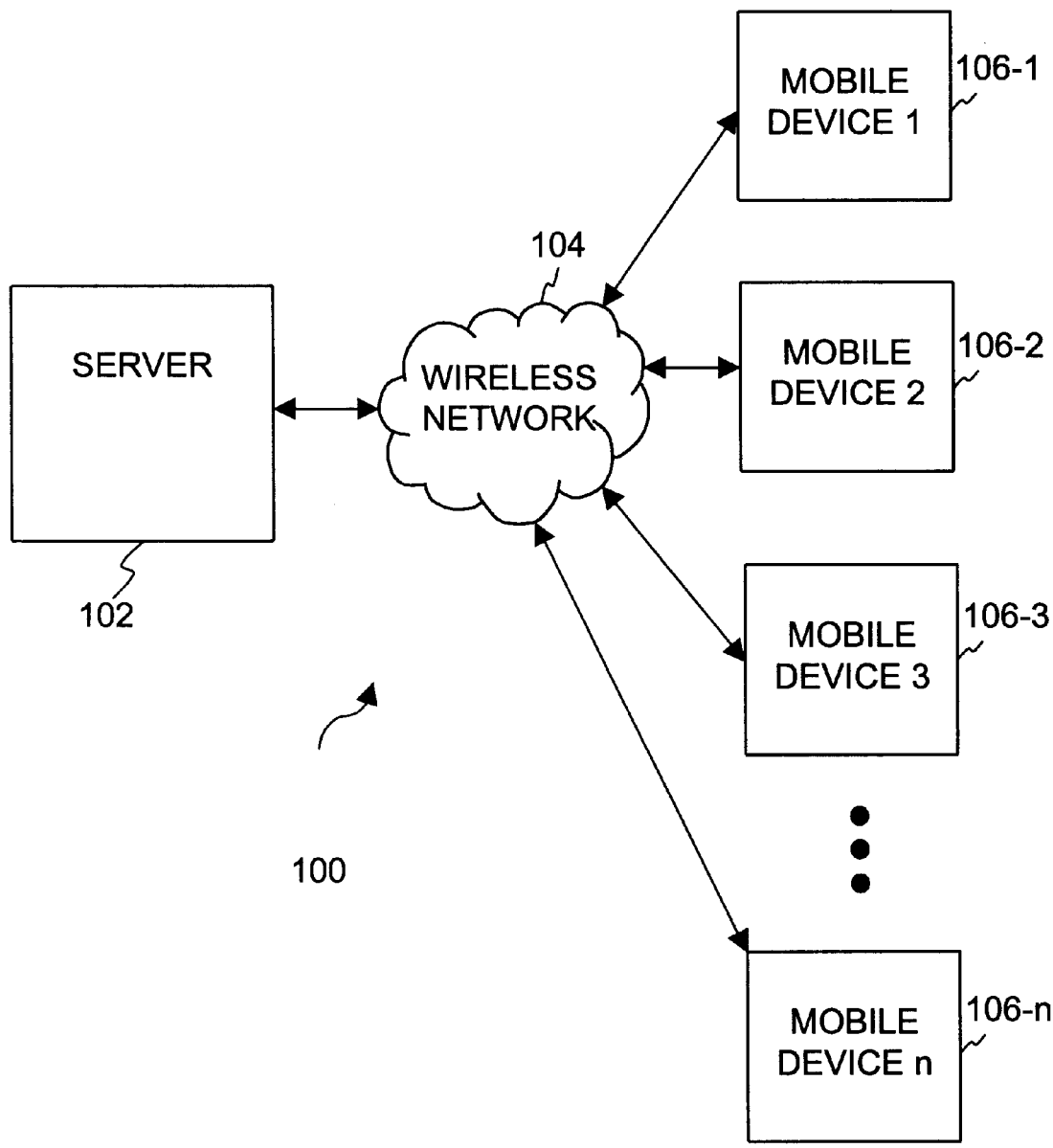
[PRIOR ART]    Fig. 1

METHOD AND APPARATUS FOR ESTABLISHING A SECURE CONNECTION OVER A ONE-WAY DATA PATH

CROSS-REFERENCE TO RELATED APPLICATIONS

This application is related to U.S. application Ser. No. 09/071,235, filed Apr. 30, 1998, and entitled "METHOD AND SYSTEM FOR INTEGRATING NARROWBAND AND WIDEBAND DATA TRANSPORTS", the content of which is hereby incorporated by reference. This application is also related to U.S. application Ser. No. 09/070,668, filed Apr. 30, 1998, and entitled "METHOD AND APPARATUS FOR PROVIDING NETWORK ACCESS OVER DIFFERENT WIRELESS NETWORKS", the content of which is hereby incorporated by reference.

BACKGROUND OF THE INVENTION

1. Field of the Invention

The present invention relates to wireless networks, and more particularly, to secure data transmissions over wireless networks.

2. Description of the Related Art

Wireless networks are often used to transmit messages from one location in a network to a destination location in the network. These messages contain data to be supplied to the destination location. More specifically, the messages include a header portion and a data portion. The header portion includes an address of the destination location, and the data portion contains data. The destination location is, for example, a mobile device or a server. A mobile device typically interacts with wireless networks to receive various types of notifications or to request and receive data from another network to which the wireless network is connected.

FIG. 1 is a block diagram of a conventional wireless communication network 100. The wireless communication system 100 includes a sever 102, a wireless network 104, and mobile devices 106. There are n mobile devices 106-1 through 106-n. The server 102 is typically a computer system that operates to send and receive messages to and from the mobile devices 106. The messages are often blocks of data that are to be transmitted to the mobile device 106. As examples, the data can pertain to various types of notifications, electronic mail, news data, configuration information, data files, library files, program files, etc. The messages can also be requests for information (e.g., certain data) that are transmitted from the mobile devices 106 to the server 102. The server 102 may also connect to other wired or wireless networks to receive messages from or forward messages to other computer systems. As an example, the server 102 can be connected to the Internet. For example, the server 102 can be a proxy server (or link server) coupled to the Internet or a network gateway coupled to a network. The tremendous growth of the Internet in recent years has fueled the need to provide mobile devices such as mobile telephones, personal digital assistants (PDAs) and the like with access to information and services available on the Internet.

The wireless network 104 typically uses radio transmissions to communicate with the mobile devices 106. The wireless network 104 can use a variety of different networks and communication protocols. Examples of wireless networks include Cellular Digital Packet Data (CDPD), Global System for Mobile Communications (GSM), Code Division Multiple Access (CDMA) and Time Division Multiple Access (TDMA) to name a few, and each of these wireless networks has different data transfer characteristics such as latency, bandwidth, protocols and connection methods. As examples, protocols can be Internet Protocol (IP), Short Messaging System (SMS) and Unstructured Supplementary Service Data (USSD), and connection methods can include packet switched or circuit switched.

As an example, a message to be sent by the server 102 to the mobile device 106-2 would contain an address that particularly identifies the mobile device 106-2. The message is then provided by the server 102 to the wireless network 104. For example, one wireless data network is a packet switched network using a Small Message Server Center (SMSC) which has a relatively small packet size (e.g., 140 bytes). The wireless network 104 causes the message to be properly routed to the mobile device 106-2 (i.e., in accordance with the address). The transmission between the wireless network 104 and mobile device 106-2 is wireless. The mobile device 106-2 receives the message that has been transmitted the wireless network 104. The mobile device 106-2 can then store the message and perform predetermined processing actions such as, for example, notifying a user of the mobile device 106-2 of the reception of the message.

Before transmitting messages or data between the server 102 and the mobile devices 106, a connection between the server 102 and the particular one of the mobile devices 106 needs to be made, unless already established. Additionally, when the data to be transmitted is private or confidential, then a secure connection is to be used. A secure connection is a type of connection in which security measures are taken so that only the sender and desired receiver can understand the data. The security measures are implemented by cryptographic techniques such as encryption. Cryptographic techniques are described in detail in Schneier, "Applied Cryptography," Second Edition, John Wiley & Sons, Inc. (1996), which is hereby incorporated by reference.

A secure connection is established in accordance with protocols concerning transmissions over wireless networks. Examples of protocols that are able to provide secure connections include Handheld Device Transport Protocol (HDTP) and Wireless Transport Layer Security (WTLS). HDTP is described in "HDTP Draft Specification," version 1.1 (1997), and is hereby incorporated by reference. The WTLS is the security layer protocol for Wireless Application Protocol (WAP). WTLS is described in "Wireless Application Protocol Wireless Transport Layer Security" (WAP WTLS), Wireless Application Forum, Apr. 30, 1998, and is hereby incorporated by reference.

One problem with the conventional approach to establishing a secure connection is that it requires a two-way data channel. As examples, both the HDTP and the WTLS protocols require a handshake operation between the server and a mobile device to establish a secure connection. Conventionally, the two-way data channel is needed to provide the handshake operation. As a result, one-way data channels have not been able to utilize the security features of protocols that require a handshake operation.

In some wireless networks, the server and the mobile devices can be connected by two or more channels. In one case, the server and mobile devices can be connected over a one-way data channel and a two-way data channel. A representative network (e.g., GSM) having such characteristics can use a Short Message Service Center (SMSC) to provide the one-way data channel and an Interworking Function (IFW) to provide the two-way data channel. In such a network, the one-way data channel is often considered a narrowband channel and the two-way data channel is often considered a wideband channel. As an example, the narrowband channel can transfer data at a rate of about 400 bits per second (bps), while the wideband channel can transfer data at a rate of at least 14400 bps. It is thus not uncommon that a server and a mobile device be connected (or connectable) by both a two-way channel and a one-way channel. Typically, the server and the client will decide to use either or both of the channels depending on the urgency of the data, the cost willing to incur, etc. Use of a two-way channel often causes the mobile device to incur charges (i.e., fees) from a carrier that provides the service to the mobile device. In contrast, use of a one-way, narrowband channel is often available at no cost or at a fixed cost regardless of usage. The one-way channel, however, is not able to establish secure connections because the conventional approaches to security require a two-way channel. This seriously impedes the secure transmission of data over one-way channels.

Thus, there is a need for improved approaches to providing secure data transmissions over one-way channels.

SUMMARY OF THE INVENTION

Broadly speaking, the invention relates to improved techniques for facilitating secure data transfer over one-way data channels or narrowband channels. Often, these channels are wireless channels provided by wireless data networks. The invention enables cryptographic handshake operations for a one-way data channel to be performed over a companion two-way data channel so that the one-way data channel is able to effectively satisfy security protocols that require two-way communications for the cryptographic handshake operations. Once the cryptographic handshake operations are complete, data can be transmitted over the one-way data channel in a secure manner. Additionally, the invention also enables the cryptographic handshake operations to be performed more rapidly because the two-way channel is typically a wideband channel. In which case, the use of a wideband channel instead of a narrowband channel for the cryptographic handshake operations results in latency reductions, regardless of whether the narrowband channel is a one-way channel or a two-way channel.

The invention can be implemented in numerous ways, including as a method, a computer readable medium, an apparatus, and a system. Several embodiments of the invention are discussed below.

As a method for securely transmitting data between a client and a server over a narrowband channel, where the client and server are connectable by not only the narrowband channel but also by a wideband channel, an embodiment of the invention includes the acts of: connecting the client and server over the wideband channel; exchanging security information between the client and server over the wideband channel; encrypting data to be transmitted from the server to the client using the security information at the server; and transmitting the encrypted data from the server to the client over the narrowband channel.

As a method for transmitting data in a secure manner from a server to a client, an embodiment of the invention includes the acts of: exchanging security information between the client and the server over a two-way channel between the client and the server; encrypting data to be transmitted from the server to the client based on the security information; and transmitting the encrypted data from the server to the client over a one-way channel between the client and the server that carries data from the server to the client.

As a wireless communication system, an embodiment of the invention includes: a wired network having a plurality of server computers; a wireless carrier network operatively connected to the wired network, the wireless carrier network supporting a first channel and a second channel, at least the first channel is a two-way data channel; a network gateway coupled between the wired network and the wireless carrier network, the network gateway includes a secure connection processor that establishes a secure connection over the first channel by exchanging security information over the second channel; and a plurality of wireless mobile devices that can exchange data with the server computers on the wired network via the wireless carrier network and the network gateway. The messages are supplied from the network gateway to the wireless mobile devices over the secure connection established over the first channel.

As a mobile device capable of connecting to a network of computers through a wireless link, an embodiment of the invention includes: a display screen that displays graphics and text; a message buffer that temporarily stores a message from a computer on the network of computers, the message having a service identity associated therewith; an application that utilizes the message received from the computer on the network of computers; and a cryptographic controller that controls encryption or signature of outgoing messages and controls the decryption or authentication of incoming messages, the cryptographic controller operates to establish a secure connection over which it receives the incoming messages by using a one-way channel, wherein a companion two-way channel is used to exchange security information needed to establish the secure connection over the one-way channel.

As a computer readable medium including computer program code for securely transmitting data between a client and a server over a narrowband channel, where the client and server are connectable by not only the narrowband channel but also by a wideband channel, an embodiment of the invention includes: computer program code for connecting the client and server over the wideband channel; computer program code for exchanging security information between the client and server over the wideband channel; computer program code for cryptographically processing data to be transmitted using the security information; and computer program code for transmitting the cryptographically processed data from the server to the client over the narrowband channel.

As a computer readable medium including computer program code for transmitting data in a secure manner from a server to a client, an embodiment of the invention includes: computer program code for exchanging security information between the client and the server over a two-way channel between the client and the server; computer program code for cryptographically processing data to be transmitted from the server to the client based on the security information; and computer program code for transmitting the cryptographically processed data from the server to the client over a one-way channel between the client and the server that carries data from the server to the client.

The advantages of the invention are numerous. Several advantages that embodiments of the invention may include are as follows. One advantage of the invention is that a secure connection can be established over a one-way channel. Another advantage of the invention is that the establishment of a secured connection can be rapidly achieved, thus improving the latency for such operations as compared to conventional approaches. Yet another advantage of the invention is that a server is provided with the option of additional secure data paths to a client (e.g., mobile device), whereby the server can use either or both of the paths depending on particular selection criteria including cost, speed and availability.

Other aspects and advantages of the invention will become apparent from the following detailed description, taken in conjunction with the accompanying drawings which illustrate, by way of example, the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 1 is a block diagram of a conventional wireless communication network;

DETAILED DESCRIPTION OF THE INVENTION

The invention relates to improved techniques for facilitating secure data transfer over one-way data channels or narrowband channels. Often, these channels are wireless channels provided by wireless data networks. The invention enables cryptographic handshake operations for a one-way data channel to be performed over a companion two-way data channel so that the one-way data channel is able to effectively satisfy security protocols that require two-way communications for the cryptographic handshake operations. Once the cryptographic handshake operations are complete, data can be transmitted over the one-way data channel in a secure manner. Additionally, the invention also enables the cryptographic handshake operations to be performed more rapidly because the two-way channel is typically a wideband channel. In which case, the use of a wideband channel instead of a narrowband channel for the cryptographic handshake operations results in latency reductions, regardless of whether the narrowband channel is a one-way channel or a two-way channel.

Embodiments of the invention are discussed below with reference to FIGS. 2A–10B. However, those skilled in the art will readily appreciate that the detailed description given herein with respect to these figures is for explanatory purposes as the invention extends beyond these limited embodiments.

Figure 2A:
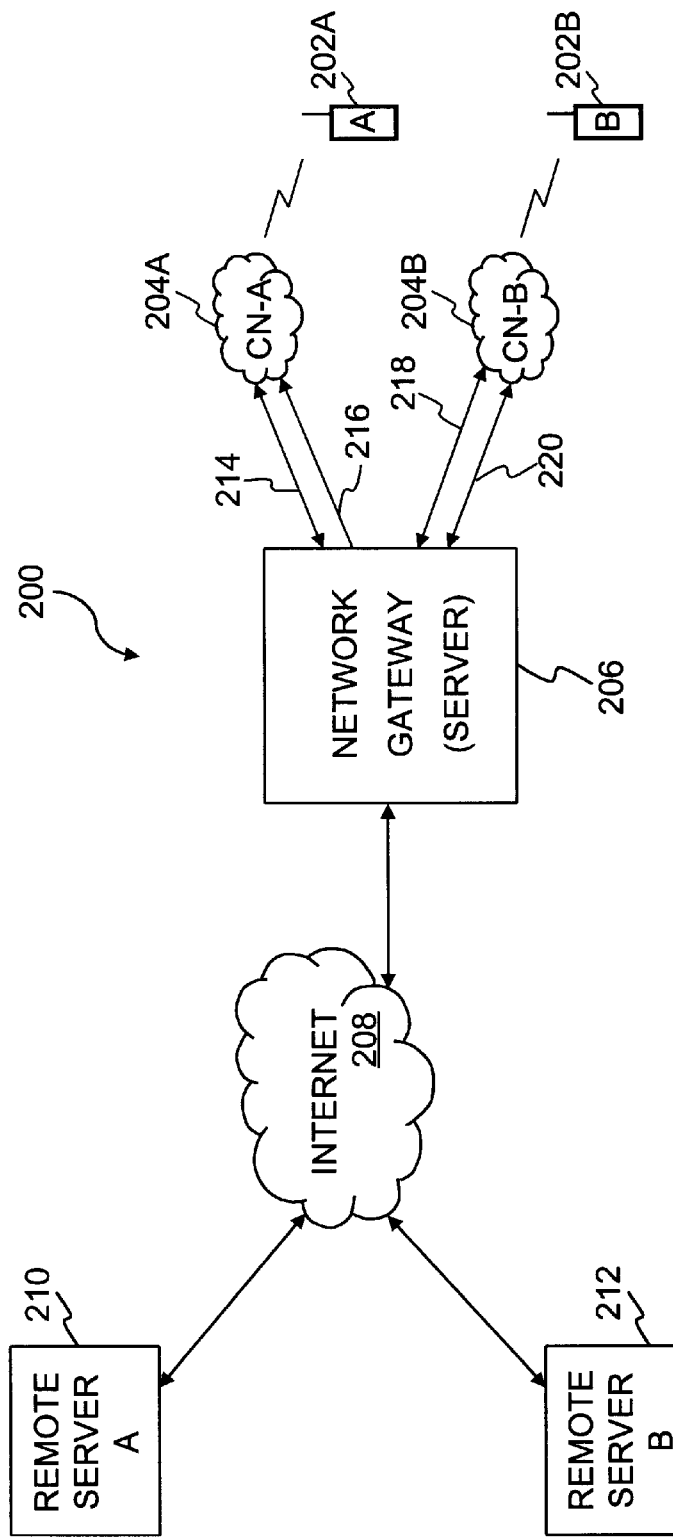
FIG. 2A is a block diagram of a communication system suitable for coupling a mobile communication device to the Internet.

FIG. 2A is a block diagram of a communication system 200 suitable for coupling a mobile communication device to the Internet. Specifically, the communication system 200 includes mobile communication devices 202A and 202B. These mobile communication devices 202A and 202B respectively couple through carrier networks 204A and 204B to a network gateway 206. The network gateway 206 facilitates the coupling of the mobile communication devices 202A and 202B with the Internet 208. As is common, various computer systems including computers supporting remote server A 210 and remote server B 212 are coupled to or form part of the Internet 208. The primary function of the network gateway 206 is to receive data requests from the mobile communications devices 202A and 202B via the carrier networks 204A and 204B, respectively, and convert them into Hyper Text Transfer Protocol (HTTP) requests for use with the Internet 208. Likewise, the network gateway 206 also receives HTTP responses from the Internet 208 and converts them to data responses with a format (e.g., protocol) suitable for use with the carrier networks 204A and 204B.

The network gateway 206 is connected to the carrier network A 204A by a first channel 214 and a second channel 216. The first channel 214 is a two-way channel or a bi-directional channel. The second channel 216 is a one-way channel or a unidirectional channel. In addition, the network gateway 206 is connected to the carrier network B 204B by a first channel 218 and a second channel 220. Both the first channel 218 and the second channels 220 are two-way channel or bi-directional channels. The carrier networks 204A and 204B then respectively connect to the mobile communication devices 202A and 202B in a wireless manner.

The transmission of data associated with data requests and data responses between the network gateway 206 and the mobile communication devices 202A and 202B is performed over connections. In some cases, when the data being transmitted is sensitive, the connections are secure connections through the Internet 208. A secure connection is a connection over which encrypted and or authenticated data is transmitted. To establish secure connections, security protocols for wireless networks require the exchange of cryptographic parameters in a handshake operation. With one-way channels, the handshaking operation could not conventionally be performed and thus secure connections could not be established over one-way channels.

According to the invention, secure connections are able to be established over one-way channels. In the embodiment of the communication system 200 illustrated in FIG. 2A, the second channel 216 is a one-way data channel which supports transmission of data from the network gateway 206 to the carrier network A 204A, and does not allow transmission of data from the carrier network A 204A to the network gateway 206. Hence, obtaining a secure connection over the second channel 216 is not possible because handshaking is not possible. However, the first channel 214 is a two-way data channel which supports transmission of data in both directions between the network gateway 206 and the carrier network A 204A. According to the invention, the first channel 214 is used to perform the necessary handshaking operations for the second channel 216 such that a secure connection is able to be established over the second channel 216. Additional details on how the handshaking is performed are provided below.

Furthermore, according to the invention, secure channels are also able to be established more efficiently or rapidly over two-way channels. In the embodiment of the communication system 200 illustrated in FIG. 2A, the first channel 218 is a two-way, wideband data channel which supports high speed transmission of data in both directions between the network gateway 206 and the carrier network B 204B. The second channel 220 is a two-way, narrowband data channel which supports high speed transmission of data in both directions between the network gateway 206 and the carrier network B 204B. According to the invention, the first channel 218 is used to perform the necessary handshaking operations for the second channel 220 such that a secure connection is able to be more efficiently and rapidly established over the second channel 220. The improvement results from the use of a wider bandwidth channel to perform the handshaking operation. Additional details on how the handshaking is performed are provided below.

The communication system 200 is a representative communication system in which the network gateway 206 is coupled to the Internet 208 such that mobile communications devices 202A and 202B can interact with the Internet 208. The connection of the mobile communication devices 202A and 202B to the network gateway 206 is through one or more wireless networks supported by the carrier networks 204A and 203B. Although not illustrated, the communication system 200 can often support a large number of mobile communication devices. Further, the Internet 208 can more generally be any network (e.g., a private network, a public network, a Wide Area Network or a Local Area Network). The network gateway 206 typically operates as a proxy server, but more generally is a server.

Figure 2B:
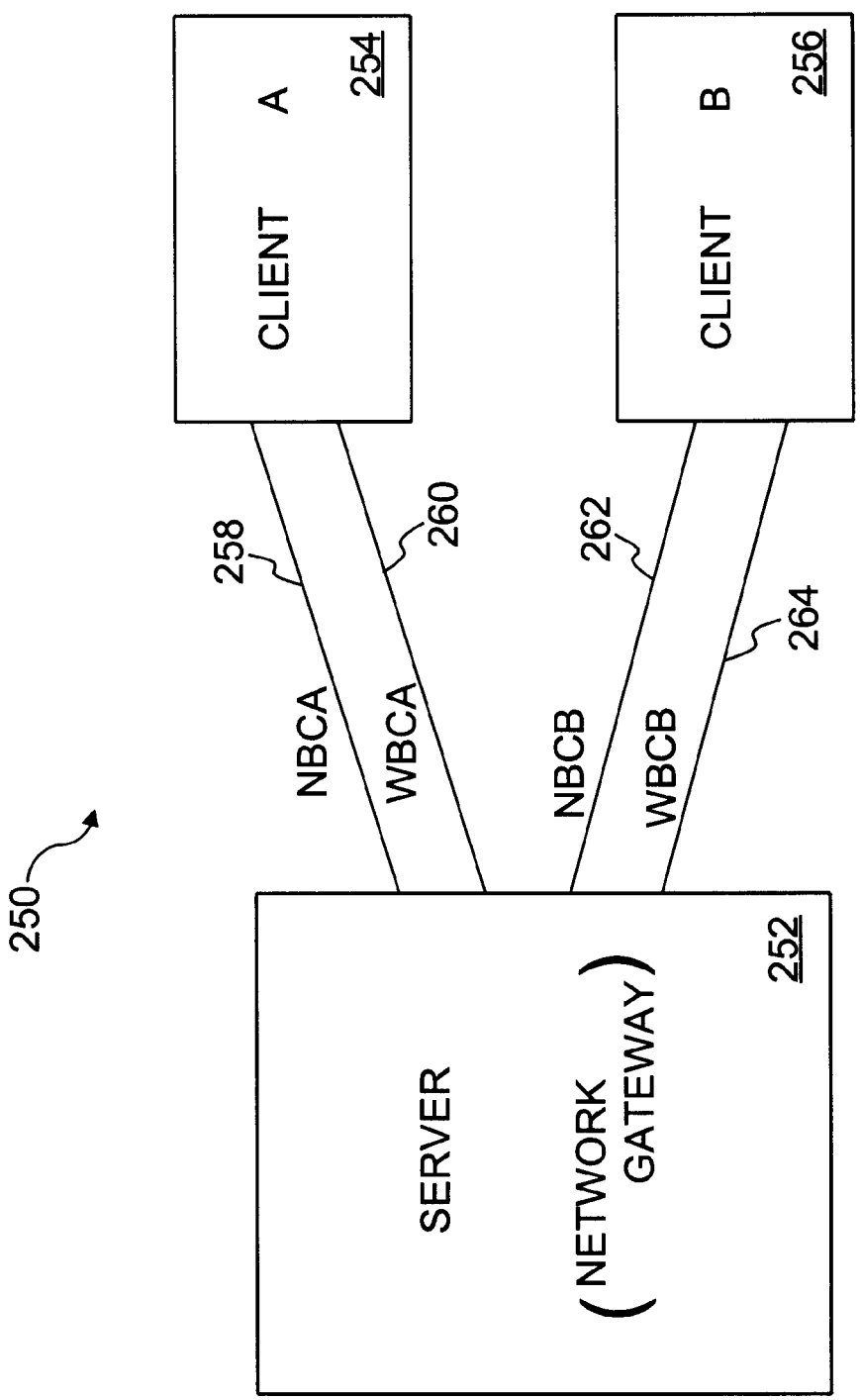
FIG. 2B is a block diagram of a communication system according to a basic embodiment of the invention.

FIG. 2B is a block diagram of a communication system 250 according to a basic embodiment of the invention. The communication system 250, for example, is a subsystem of a larger communication system such as the communication system 200 illustrated in FIG. 2A. The communication system 250 includes a server 252, a client A 254 and a client B 256. A server 252 can take a variety of forms including a proxy server or a network gateway. The server 252 interacts with the clients 254 and 256 to exchange data between the server and the client. Typically, the server 252 couples to a network and thus enables the clients 254 and 256 to interact with the network. The network can take a variety of forms include a Local Area Network (LAN), a Wide Area Network (WAN) or the Internet. Often the server 252 will support more clients than the two clients 254 and 256 illustrated in FIG. 2B.

Each of the clients 254 and 256 are connected the server 252 through a pair of communication channels. These communication channels are wireless channels and can be constantly connected (linked) or temporarily connected (linked). While these connections or links are preferably wireless (i.e., not wired), some portion of the connections can be wired as is known in the art. These wireless communication channels can be provided by a variety of wireless networks, including packet switched wireless data networks or circuit switched wireless data networks. More particularly, the server 252 is connected to the client A 254 through a narrowband channel A (NBC$_A$) 258 as well through as a wideband channel A (WBC$_A$) 260. Similarly, the server 252 is connected to the client B 256 through a narrowband channel (NBC$_B$) 262 as well as through a wideband channel B (WBC$_B$) 264. The narrowband channel A (NBC$_A$) and the wideband channel A (WBC$_A$) can be considered provided by a wireless network A, and the narrowband channel B (NBC$_B$) and the wideband channel B (WBC$_B$) can be considered provided by a wireless network B.

The wideband channels (WBC$_A$ and WBC$_B$) 260 and 264 support greater bandwidths or data transfer rates than do the narrowband channels (NBC$_A$ and NBC$_B$) 258 and 262. Accordingly, the ability to transfer data between the server and the client is significantly slower on the narrowband channels as opposed to the wideband channels. As an example, narrowband channels can transfer data at a rate of about 400 bits per second (bps), while wideband channels can transfer data at a rate of at least 14400 bps. The trade-off in bandwidth or transfer rate is typically reflected in the cost for use of the respective channels. In other words, it is often more expensive to transmit data over the wideband channel than the narrowband channel.

Often, there is a need or desire to transmit data between server and client in a secure manner. In such cases, cryptographic techniques (e.g., encryption) are used to provide the secure data transfer. As noted above, encryption techniques normally require that a server and a client perform a handshake operation in which security information is passed from client to server and from server to client. After the server and the client perform the handshake operation, the server and client are able to encrypt data at one end, transmit the encrypted data, and then decrypt the received data at the other end.

In the case of the wideband channels (WBC$_A$ and WBC$_B$) 260 and 264, the exchanging of security information via the handshake operation is easily achieved because the wideband channels are normally two-way channels. However, the narrowband channels (NBC$_A$ and NBC$_B$) 258 and 262 are often one-way channels that support transmissions from the server to the client but not from the client to server. As such, when the narrowband channels (NBC$_A$ and NBC$_B$) 258 and 262 are one-way channels, the exchanging of security information via the handshake operation cannot be performed. Additionally, even when a narrowband channel is a two-way channel, the latency or delay to perform the handshake operation over the narrowband channel is greater (as compared to a wideband channel) due to its often significantly lower bandwidth or data transfer rate than the wideband channel.

According to the invention, secure data transfer can be performed over one channel because the exchange of the security information for a handshake operation occurs over another channel. In one embodiment, the exchange of security information is performed over a two-way channel so that secure data transfer can be performed over a one-way channel. In another embodiment, the exchange of security information is performed over a wideband channel so that secure data transfer can be performed over a narrowband channel.

Figure 3:
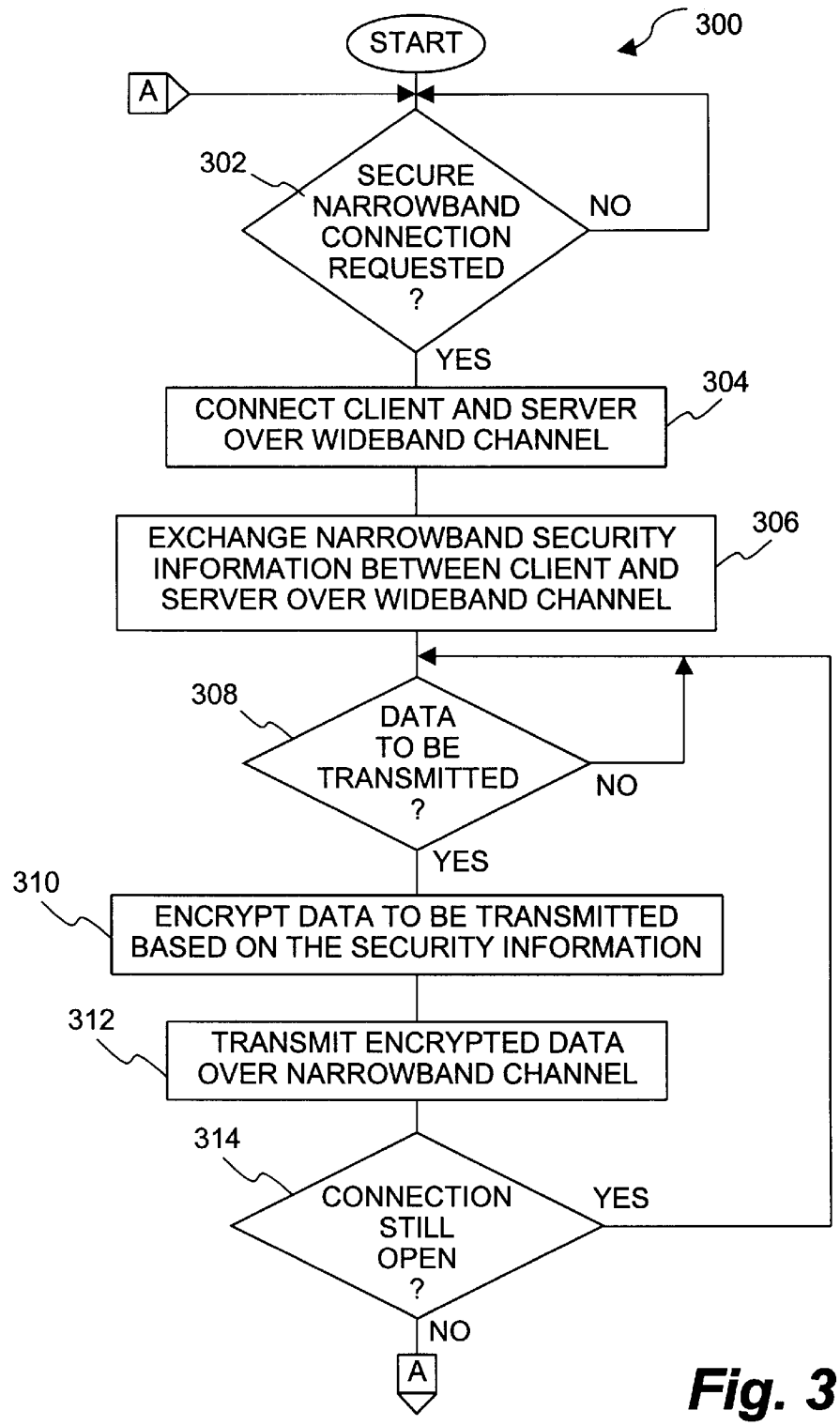
FIG. 3 is a flow diagram of narrowband secure data transmission processing according to an embodiment of the invention.

FIG. 3 is a flow diagram of narrowband secure data transmission processing 300 according to an embodiment of the invention. The narrowband secure data transmission processing 300 occurs between a client and a server and can, for example, be performed by the communication system 200 illustrated in FIG. 2a.

The narrowband secure data transmission processing 300 begins with a decision block 302. As an example, the server may request a secure narrowband connection when it desires to send (or "push") data to a particular client. When the decision block 302 determines that a secure narrowband connection has not been requested, then the narrowband secure data transmission processing 300 awaits the reception of such a request. In other words, the narrowband secure data transmission processing 300 is only utilized when secure data transmission are to occur over a narrowband channel, other non-secure transmissions or secure transmissions over wideband channels follow other processing known in the art.

Once the decision block 302 determines that a secure narrowband connection has been requested, then processing is invoked to carry out the narrowband secure data transmission processing 300. Specifically, the client and the server are connected 304 over a two-way wideband channel. Then, narrowband security information is exchanged 306 between the client and the server over the wideband channel. The security information typically contains keys and other crpytographic parameters used with encryption algorithms. One popular set of encryption algorithms include public-key encryption algorithms. It should be noted that the exchange of the security information is being performed over the wideband channel when the connection request is for the transmission of data over the narrowband channel. Following block 306, the client and server are able to set up a secure connection between the server and the client over the narrow band channel because the required handshake operation has been performed. In other words, the security information that has been exchanged over the wideband channel is used to set up the secure connection over the narrowband channel.

Next, a decision block 308 determines whether there is data to be transmitted. When the decision block 308 determines that there is presently no data to be transmitted, then the narrowband secure data transmission processing 300 awaits the availability of data. Once the decision block 308 determines that data is available to be transmitted, then the data to be transmitted is encrypted 310 based on the security information. After the data is encrypted, the encrypted data is transmitted 312 over the narrowband channel. Here, the connection between the server and the client over the narrowband channel is assumed to be already established. However, in other embodiments, prior to the transmission of the encrypted data over the narrowband channel, a connection between the server and client over the narrow band channel may need to be established.

Following block 312, a decision block 314 determines whether the connection over the narrowband channel is still open. For a variety of reasons, a connection is often closed, and these reasons include a time-out condition, an error condition, or for security reasons. When the decision block 314 determines that the connection is still open, the narrowband secure data transmission processing 300 returns to repeat the decision block 308 and subsequent blocks. On the other hand, once the decision block 314 determines that the connection is no longer open, then the narrowband secure data transmission processing 300 returns to repeat the decision block 302 and subsequent blocks so that secure connection is re-established.

The narrowband channel used with the narrowband secure data transmission processing 300 can be either a one-way (server to client) or a two-way channel. As noted above, the invention provides advantages in either situation, though the invention is particularly beneficial when the narrowband channel is only a one-way channel from server to client.

Figure 4:
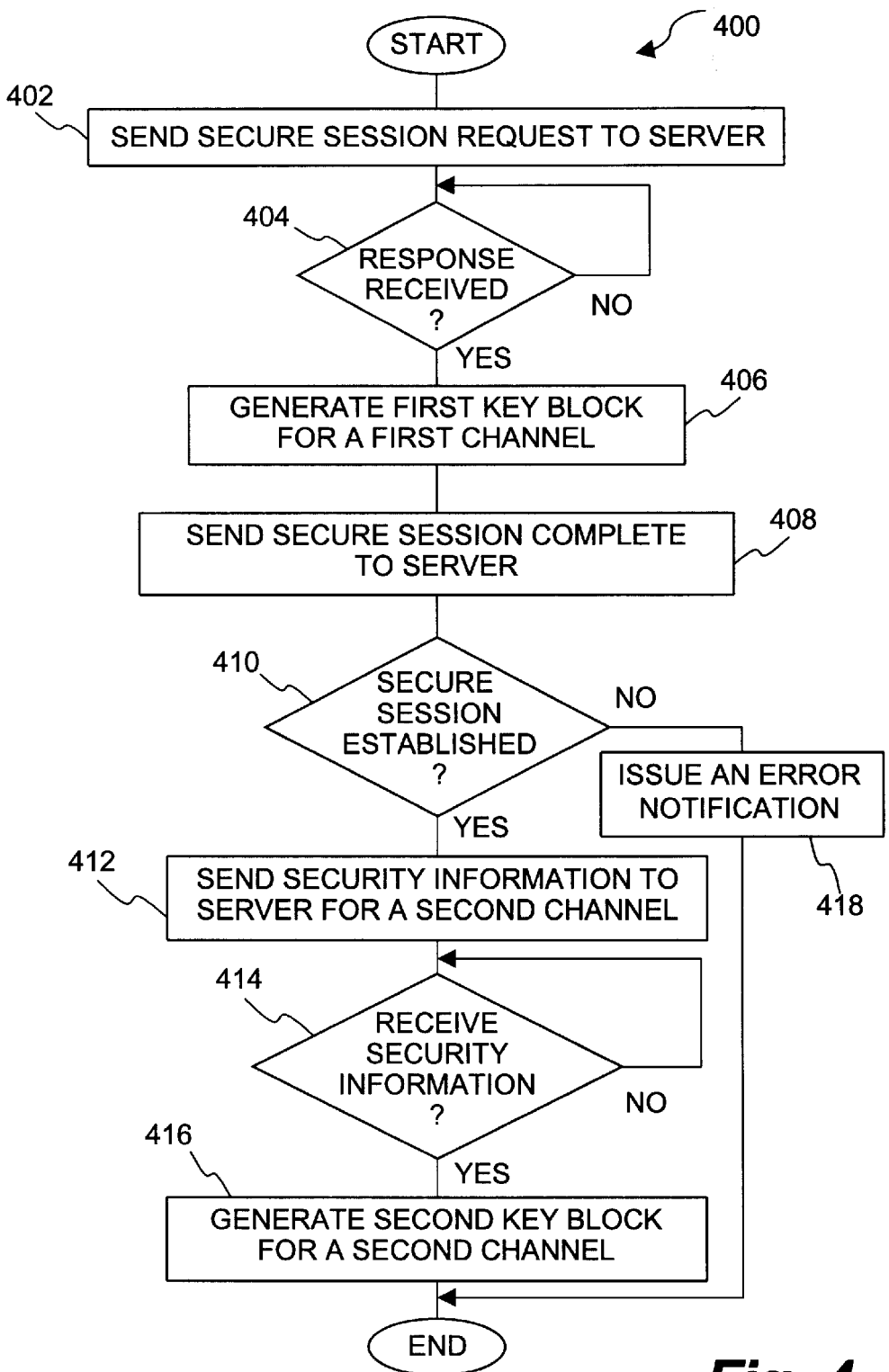
FIG. 4 is a flow diagram of client-side secure connection processing according to an embodiment of the invention.
Figure 5:
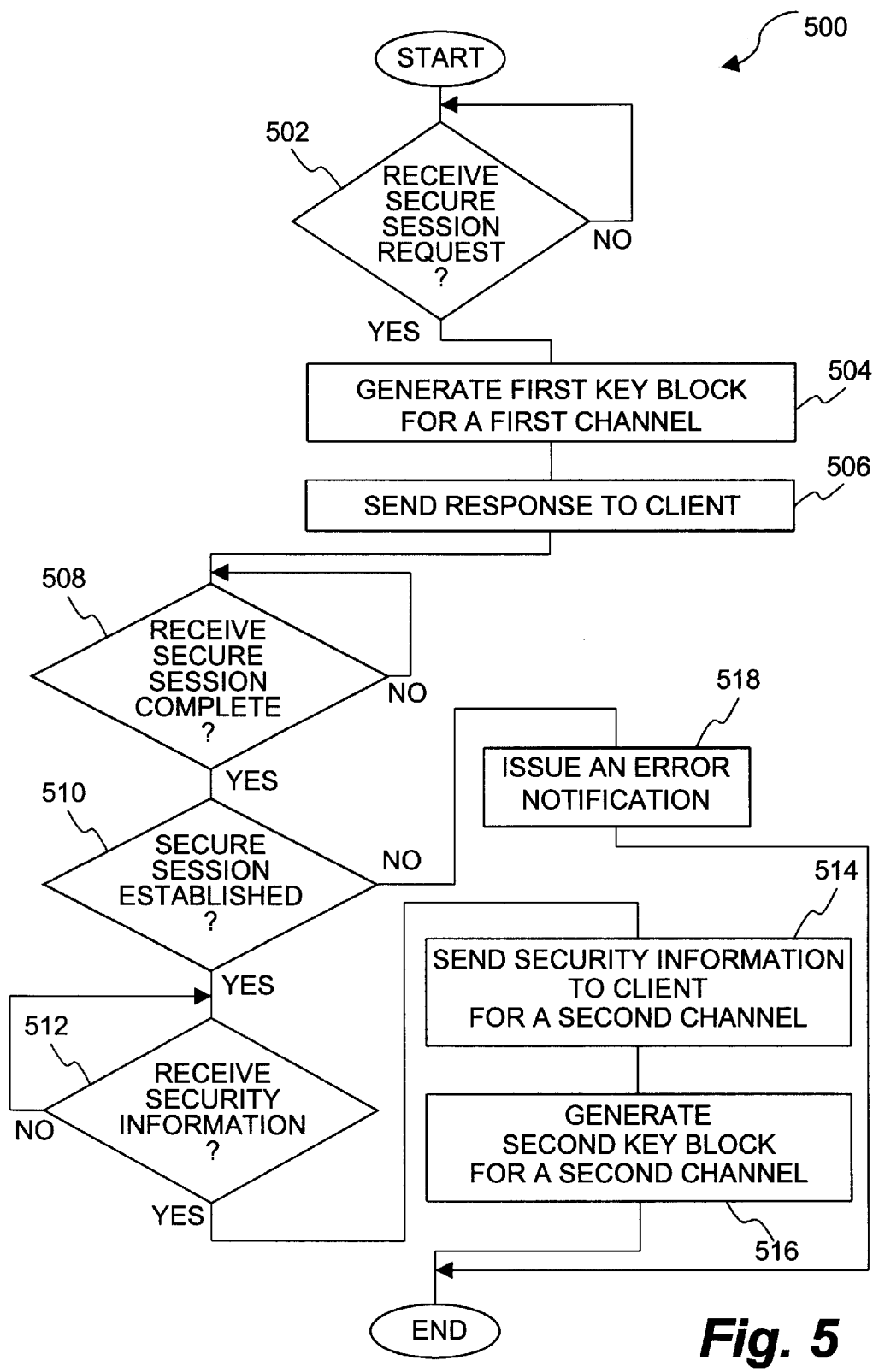
FIG. 5 is the flow diagram of server-side secure connection processing according to an embodiment of the invention.

Given that the server 252 and the clients 254 and 256 are connected by at least a pair of channels (258–264) as shown in FIG. 2B, it is not uncommon for secure transmissions to be concurrently utilized over both of the channels between server and client. In such cases, each channel needs to effectuate a handshaking operation to exchange security information needed for the establishment of a secure connection. FIGS. 4 and 5 describe the establishment of dual secure connections for a pair of channels between a server and a client.

FIG. 4 is a flow diagram of client-side secure connection processing 400 according to an embodiment of the invention. The client-side secure connection processing 400 is, for example, performed by a client such as the client 254 or the client 256 illustrated in FIG. 2a. In this embodiment, it is assumed that both first and second channels between a client and a server are to be used to provide secure connections.

The client-side secure connection processing 400 initially sends 402 a secure session request to a server (e.g., the server 202 illustrated in FIG. 2). Here, the secure session request is a request to setup secure connections over first and second channels. A decision block 404 then determines whether a response to the secure session request has been received. Here, the client is awaiting a response from the server. When the decision block 404 determines that a response has not yet been received, the decision block 404 causes the client-side secure connection processing 400 to await the reception of such a response. The request and response operate to exchange security information as a first handshake operation in accordance with a security protocol. The security information, for example, would contain cryptographic parameters that specify keys, random numbers, algorithms, vectors and the like for various cryptographic techniques.

Once a response has been received, a first key block for a first channel between the server and the client is generated 406. The first key block is used to contain keys used to encrypt or authenticate data or blocks of data that are to be transmitted between the server and the client via the first channel. Thereafter, a secure session complete notification is sent 408 to the server. The secure session complete is a notification to the server that the client has acknowledge receipt of the response and is prepared for a secured session.

Next, a decision block 410 determines whether a secure session has been established for the first channel. A secure session is established the client requests and the server agrees to setup the secure session, and then does setup the secure session. When the decision block 410 determines that the secure session has been established, then the secured session for the first channel is ready.

Now, the secure session for a second channel is established. Security information for the second channel is also sent 412 from the client to the server. It should be noted that the security information is sent 412 to the server over the first channel. The reasons for using the first channel are (i) necessity when the second channel cannot transmit data to the server or (ii) a latency improvement when the second channel is a narrowband channel.

Next, a decision block 414 determines whether security information has been received from the server. The security information from the server is also received over the first channel. The security information from the server is in response to the security information sent to the server by the client. This exchange of security information is a second handshake operation in accordance with a security protocol. The decision block 414 causes the client-side secure connection processing 400 to await the reception of security information from the server. Once the decision block 414 determines that the security information has been received, a second key block for a second channel is generated 416.

Again, the second key block contains session keys that are used to encrypt or authenticate data or blocks of data that are to be transmitted over the second channel in a secure manner. Following block 416, the client-side secure connection processing 400 is complete and ends.

Additionally, when the decision block 410 determines that the secure session has not been established between the server and the client, then the client-side secure connection processing 400 issues 418 an error notification. Following block 418, the client-side secure connection processing 400 is complete and ends.

FIG. 5 is the flow diagram of server-side secure connection processing 500 according to an embodiment of the invention. The server-side secure connection processing 500 is, for example, performed by a server such as the server 252 illustrated in FIG. 2B.

The server-side secure connection processing 500 begins with a decision block 502. The decision block 502 determines whether a secure session request has been received. Typically, the secure session request will be issued by a client and then received by the server. The decision block 502 causes the server-side secure connection processing 500 to await the reception of a secure session request. Here, the secure session request is a request to setup secure connections over first and second channels.

Once a secure session request has been received, the server-side secure connection processing 500 continues. A first key block for a first channel is generated 504. A response is then sent 506 to the client that has requested the secure session. The secure session request and the response operate to exchange security information as a first handshake operation in accordance with a security protocol. Examples of protocols for a wireless network environment are HDTP and WAP WTLS. The security information, for example, would contain cryptographic parameters that specify keys, random numbers, algorithms, vectors and the like for various cryptographic techniques.

Next, a decision block 508 determines whether a secure session complete notification has been received. The secure session complete protocol is sent by the client to the server when the client has established a secure session for the first channel. The decision block 508 causes the server-side secure connection processing 500 to await the reception of the secure session complete notification. A decision block 510 then determines whether a secure session is established. When the decision block 510 determines that a secure session has been established, a decision block 512 determines whether security information has been received. Here, the security information would be received at the server after having been transmitted by the client. The security information is for the second channel. The client would send the security information to the server as part of its communications with the server in accordance with a protocol to establish a secure session for the second channel. As an example, the protocol here can be a session layer protocol or a transport layer protocol (e.g., HDTP).

Once the decision block 512 determines that the security information for the second channel sent to the client has been received, then the server sends 514 security information for the second channel to the client. A second key block is then generated 516 for the second channel. Following block 516, the server-side secure connection processing 500 is complete and ends.

Additionally, when the decision block 510 determines that a secure connection cannot be established between the server and the client, the server-side secure connection processing 500 issues 518 an error notification. Following block 518, the server-side secure connection processing 500 is complete and ends.

The sending and receiving of a secure session request as well as the sending and receiving of the security information are performed over the first channel. The information exchanged between client and server over the first channel is used to setup the secure communications between the client and server over the first channel and the second channel. The first key block is used to encrypt data transmitted over the first channel from the client to the server as well as to decrypt data received from the server over the first channel. The second key block is used to decrypt data received from the server over the second channel. In one embodiment, the first channel is a two-way channel and the second channel is a one-way channel. In another embodiment, the first channel is a two-way, wideband channel and the second channel is a two-way, narrowband channel.

In the case where the security protocol involved is HDTP, the secure session for the first channel is performed in ordinary course. The secure session for the second channel can piggyback on the client and server exchanges for the secure session for the first channel. Namely, HDTP uses HTTP type content transfer and thus headers (e.g., session headers) are normally exchanged between client and server. These headers can be used to exchange the security information for the second channel (blocks 414, 416, 512 and 514).

In the case where WAP is used, the security protocol involved is WTLS and a session-level protocol is Wireless Session Protocol (WSP). WSP also performs uses HTTP type content transfers. When WSP and WTLS create a secure session, headers (e.g., session headers) are normally exchanged between client and server. As with HDTP, these headers can be used to exchange the security information for the second channel (blocks 414, 416, 512 and 514).

Regardless of the specific protocol being used, a portion of the security information can be common (or shared) by both channels. In the case where the Diffie Hellman public-key encryption algorithm is used, the exchanges during the handshake operations include a key exchange and a random number exchange. Hence, normally, a key exchange and a random number exchange would be separately required for each channel. However, by sharing the same key for both channels, the second key exchange can be eliminated. Likewise, the sharing of the same random number can eliminate the random number exchange. The sharing of a portion of the security information improves latency or efficiency of the secure connection setup, but can result in a reduction in the strength of the security.

Moreover, it may be desirable to used the same security information for both (e.g., multiple) channels. In such cases, there need not be any exchange of security information for the second channel (or more channels) besides the security information exchanged for the first channel. Here, all the security information would be shared by the channels. Different connection identifiers would, however, distinguish the connections. For example, with respect to FIG. 4, blocks 412 and 414 could be eliminated, and with respect to FIG. 5, blocks 512 and 514 could be eliminated. Also, the generation of the second key block (blocks 416 and 516), could be eliminated by sharing of a key bock (e.g., first key block). Thus, secure connections can be setup over both (or multiple) channels using the same cryptographic parameters, with the tradeoff being a reduction in strength of the security.

Figure 6:
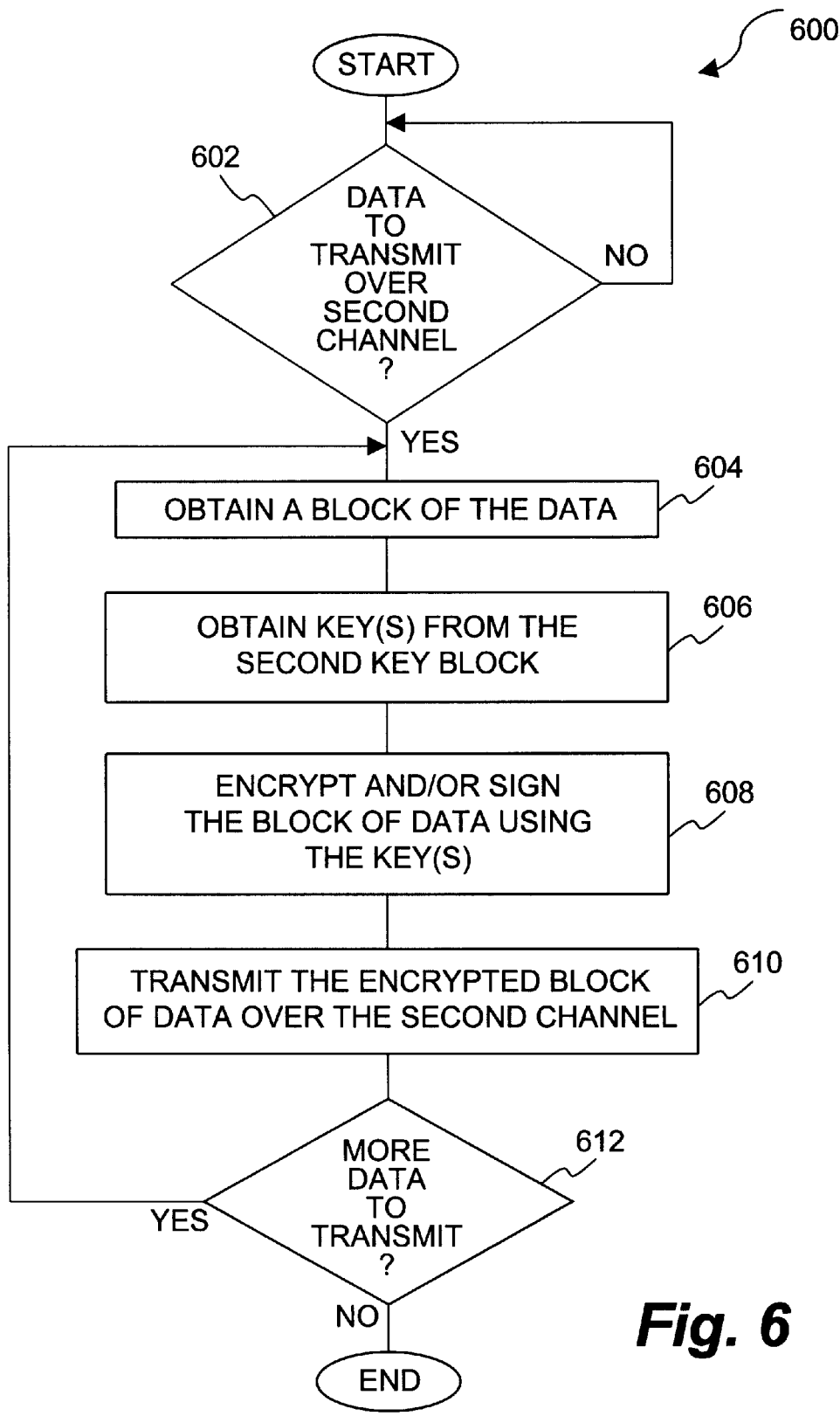
FIG. 6 is a flow diagram of data transmission processing according to an embodiment of the invention.

FIG. 6 is a flow diagram of data transmission processing 600 according to an embodiment of the invention. In this embodiment, the data is typically transmitted over a second channel from the server to the client. As an example, the second channel is a one-way narrowband channel. The data transmission processing 600 follows the establishment of the secure session (connection) between the server and the client over the second channel as depicted in FIG. 4. Data transmission, if any, over the first channel is not shown.

The data transmission processing 600 begins with a decision block 602. The decision block 602 determines whether there is data to transmit over the second channel. When the decision block 602 determines that there is presently no data waiting to be transmitted over the second channel, then the data transmission processing 600 simply awaits the reception of such data.

Once the decision block 602 determines that there is data to be transmitted over the second channel, then the data transmission processing 600 proceeds so that the data is transmitted. Again, the secure session (connection) has already been setup for the second channel. Specifically, a block of the data is obtained 604. One or more keys from the second key block are obtained 606. Typically, an authentication key and an encryption key are obtained from the second key block. An initialization vector can also be obtained from the second key block. The initialization vector is used as a random seed for block-cipher encryption algorithms. Here, the second key block was generated in block 514 of the server-side secure connection processing 500 illustrated in FIG. 5. The second key block is located at the server.

Next, the block of data is encrypted and/or sign 608 using the key(s) obtained from the second key block. The particular signature technique used is, for example, a one-way hash algorithm. The particular encryption algorithm used can vary widely, but often public-key encryption algorithms are appropriate. In one embodiment, assuming both signature and encryption are desired, the block of data would be signed using the signature technique and the authentication key, and the block of data would be encrypted using the encryption algorithm and the encryption key, and then the two process blocks would be appended together.

Following block 608, the encrypted block of data is transmitted 610 over the second channel. Thereafter, a decision block 612 determines whether there is more data to be transmitted over the second channel. When the decision block 612 determines that there is more data to be transmitted, then the data transmission processing 600 returns to repeat the block 604 and subsequent blocks. On the other hand, when the decision block 612 determines that there is no more data to be transmitted over the second channel, then the data transmission processing 600 is complete and ends.

Figure 7:
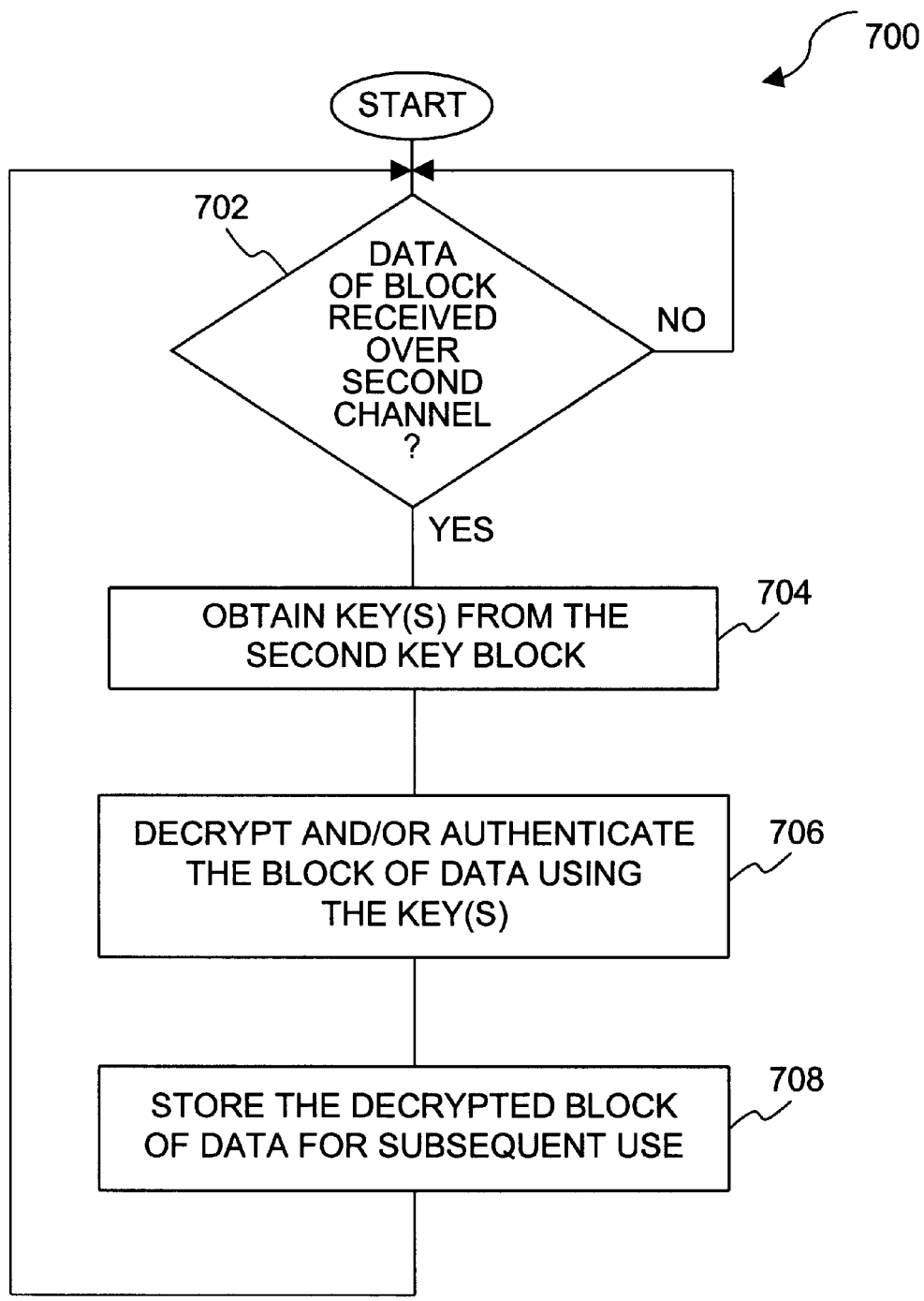
FIG. 7 is a flow diagram of data reception processing according to an embodiment of the invention.

FIG. 7 is a flow diagram of data reception processing 700 according to an embodiment of the invention. In this embodiment, data is being received over a second channel. As an example, the second channel is a one-way, narrowband channel from the server to the client. In one implementation of the data reception processing 700, the processing is performed by a client such as the client 254 and 256 illustrated in FIG. 2B. The data reception processing 700 follows the data transmission processing 600, and thus the establishment of the secure session (connection) between the server and the client over the second channel as depicted in FIG. 4. Data reception, if any, over the first channel is not shown.

The data reception processing 700 begins with a decision block 702. The decision block 702 determines whether a block of data has been received over the second channel. The decision block 702 causes the data reception processing 700 to wait until at least one block of data has been received over the second channel. However, once the decision block 702 determines that at least one block of data has been received over the second channel, the data reception processing 700 continues so that the block of data can be processed. Namely, one or more keys are obtained 704 from the second key block. Typically, an authentication key and an encryption key are obtained from the second key block. An initialization vector that is used as a random seed for block-cipher encryption algorithms can also be obtained from the second key block. Here, the second key block is, for example, the second key block that was generated in block 414 of the client-side secure connection processing 400 illustrated in FIG. 4. In other words, the second key block here is local to the client.

Next, the block of data that has been received is decrypted and/or authenticated 706 using the key(s) that were obtained from the second key block. In one embodiment, assuming both signature and encryption were performed at the server side on the data being transmitted and now received at the client, the block of data received would be both signed and encrypted. Hence, in such an embodiment, the received block of data would be authenticated using the authentication key obtained 704 from the second key block at the client side, and the received block of data would also be decrypted using the encryption key also obtained 704 from the second key block at the client side.

After the block of data has been decrypted and/or authenticated 706, the decrypted block of data is stored 708 for subsequent use. Following block 708, the data reception processing 700 returns to repeat the decision block 702 and following blocks so that subsequent blocks of data can be processed as they are received over the second channel.

Carrier networks are commonly classified into packet-switched networks and circuit-switched networks. In packet-switched networks, communications between the carrier network and the wireless communication device can use Internet Protocol (IP) addressing because the wireless communication device has its own individual IP address. Circuit-switched networks, on the other hand, require the establishment of a circuit with the carrier network before the wireless communication device can communicate with the carrier network. In such networks, the wireless communication devices do not have a static IP address but instead have a dynamically assigned IP address or unique phone numbers. One example of a packet-switched carrier network is CDPD. One example of a circuit-switched network is Code Division Multiple Access (CDMA) and Global System for Mobile communications (GSM).

Figure 8:
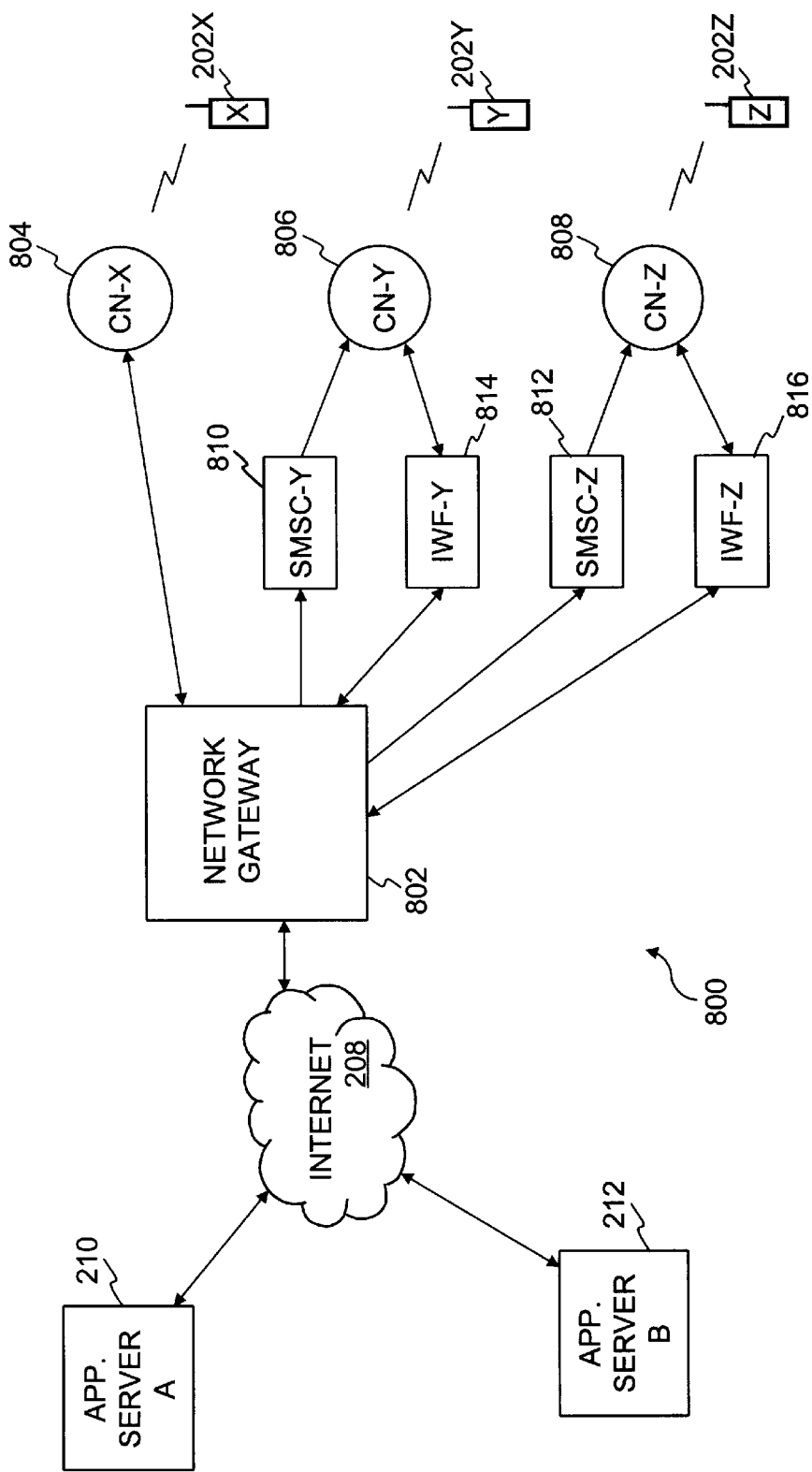
FIG. 8 is a block diagram of a communication system according to an embodiment of the invention.

FIG. 8 is a block diagram of a communication system 800 according to an embodiment of the invention. The communication system 800 includes a network gateway 802 that facilitates access and retrieval of information from the Internet 208 to the wireless communication devices 202X, 202Y and 202Z. The network gateway operates similar to the network gateway 206 illustrated in FIG. 2A. The communication system 800, however, specifically pertains to the situation where the carrier network X 804 is a packet-switched network such as CDPD, the carrier network Y 806 is a SMS-type network using CDMA with an interface protocol of SMPP, and the carrier network C 808 is another SMS-type network that uses GSM with an interface protocol of UCP.

Since the carrier network Y 806 and the carrier network Z 808 are circuit-switched networks using SMS, they use Small Message Server Centers (SMSCs) and Inter-Working Functions (IWF) to provide communication with the carrier networks. The use of the SMSCs and the IWFs are conventional and typically provided by the carrier networks so that messaging and interaction can be achieved with the carrier networks. Hence, the communication system 800 includes SMSC-Y 810 and SMSC-Z 812 which respectively provide message services to wireless communication devices coupled to the carrier network Y 806 and the carrier network Z 808, respectively. The SMSCs 810 and 812 provide one-way notifications from the multi-network gateway 802 to the wireless communication devices on the carrier network Y 806 and the carrier network Z 808, respectively. The IWF-B 814 and the IWF-C 816 are respectively used to provide two-way interaction between the network gateway 802 and the carrier network-Y 806 and the carrier network-Z 808, respectively. The SMSC connections to the carrier networks are typically referred to as narrowband channels, whereas the IWF connections to the carrier networks are wideband channels. In this embodiment, the SMSC connections to the carrier networks are one-way, narrowband channels, whereas the IWF connections to the carrier networks are two-way, wideband channels.

Figure 9:
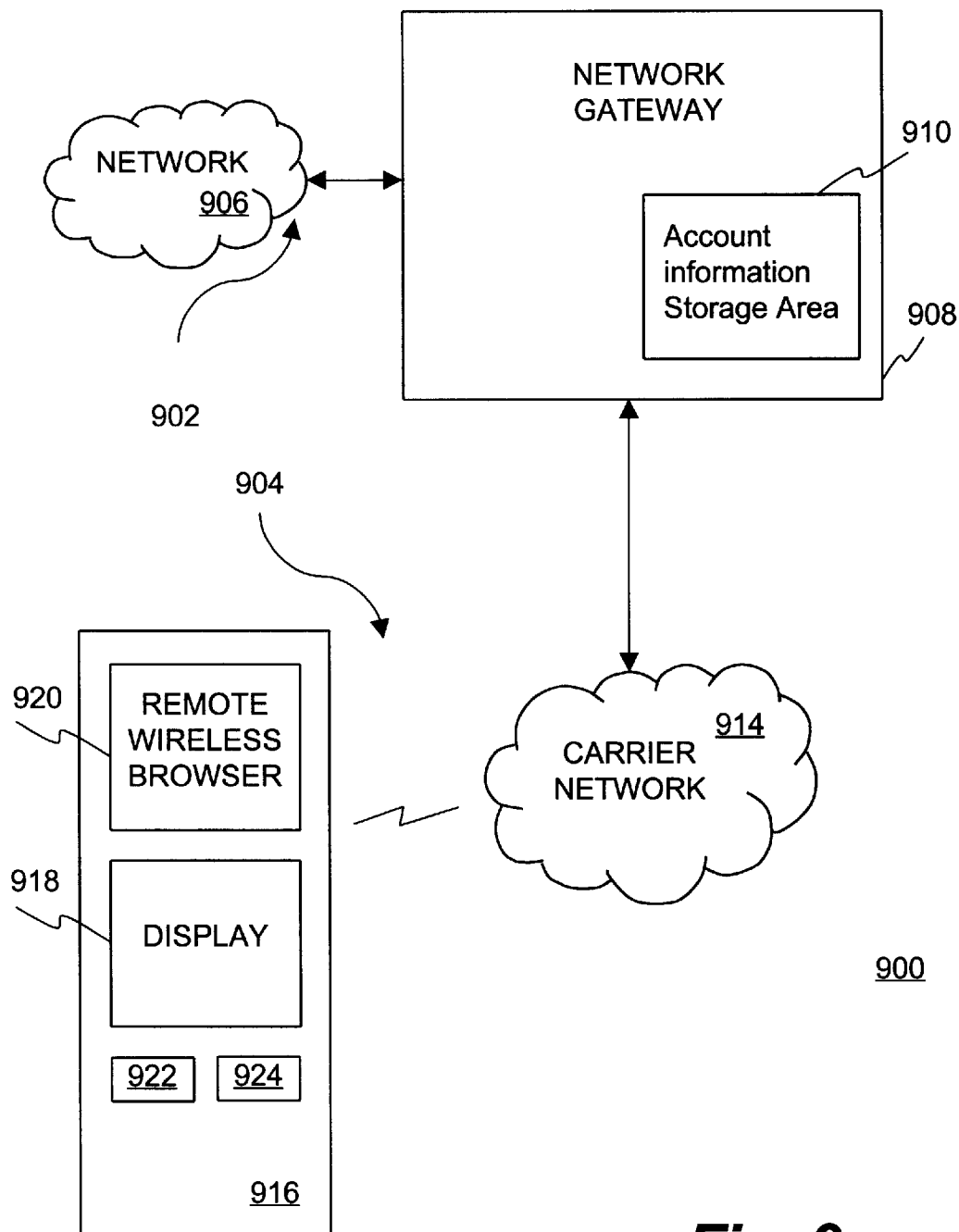
FIG. 9 is a block diagram of a representative communication system for use with the invention.

FIG. 9 is a block diagram of a representative communication system 900 for use with the invention. The communication system 900 includes a wired section 902 and a wireless section 904. The wired section 902 includes a network 906 and a network gateway 908. In one embodiment, the network 906 is the Internet, which represents a large number of interconnected computers. In another embodiment, the network 906 is an intranet or private network of computers.

The network gateway 908 operates to provide a gateway from the wired section 902 and the wireless section 904. The network gateway 908 serves as a primary transition point between the wireless communication of the wireless section 904 and the wired communication of the wired section 902. The network gateway 908 receives the incoming content request from the carrier network 914 and performs protocol conversion as necessary. The network gateway 908 will normally perform some protocol translation and other account management and verification operations. The network gateway 908 includes an account information storage area 910 that stores account, configuration and other information. The wireless section 904 includes a carrier network 914 and at least one remote wireless computing device 916. The network gateway 908 also receives messages from the network 906 and forwards them to the appropriate remote computing devices.

The remote computing device 916 can, for example, be a mobile phone, a Personal Digital Assistant (PDA), or a portable general purpose computer. The remote wireless computing device 916 includes a display 918 for displaying screens or pages of information, a remote wireless browser 920, and navigation buttons 922 and 924. The remote wireless browser 920 is usually an application program that executes on the remote computing device 916. The remote wireless browser 920 provides the screens or pages of information to be displayed on the display 918. The navigation buttons 922 and 924 allow a user to navigate through or make selections from menus or lists being displayed on the display 918 by the remote wireless browser 920. The remote wireless computing device 916 can also include an alphanumeric keypad (not shown) that allows a user to enter alphanumeric information, though such is not necessary as alphanumeric information can also be entered using a dial screen displayed on the display 918 with selections being made using the navigation buttons 922 and 924. By interacting with the remote wireless browser 920, a user is able to access information located on the network 906. According to the invention, secure sessions between at least over the wireless section 904, namely between the remote wireless browser 920 and the network gateway 908. As noted above, these secure sessions can be provided even on one-way channels through the carrier network 914.

Typically, the wireless section 904 will include a plurality of remote wireless browsers 920, each of which executes on a different remote computing device. The configuration and other information stored in the account information storage area 910 can store service limitations, security limitations, preference information, screen configuration information, and the like for each of the remote wireless browsers 920. The account information storage area 910 can also store data or pages of data that are of interest to the remote wireless browsers 920. The stored data or pages can operate as a cache of information previously requested from the network 906 or can operate as an information server within the network gateway 908. For example, as an information server, the storage pages can represent pages to be displayed by the remote wireless browsers.

Figure 10A:
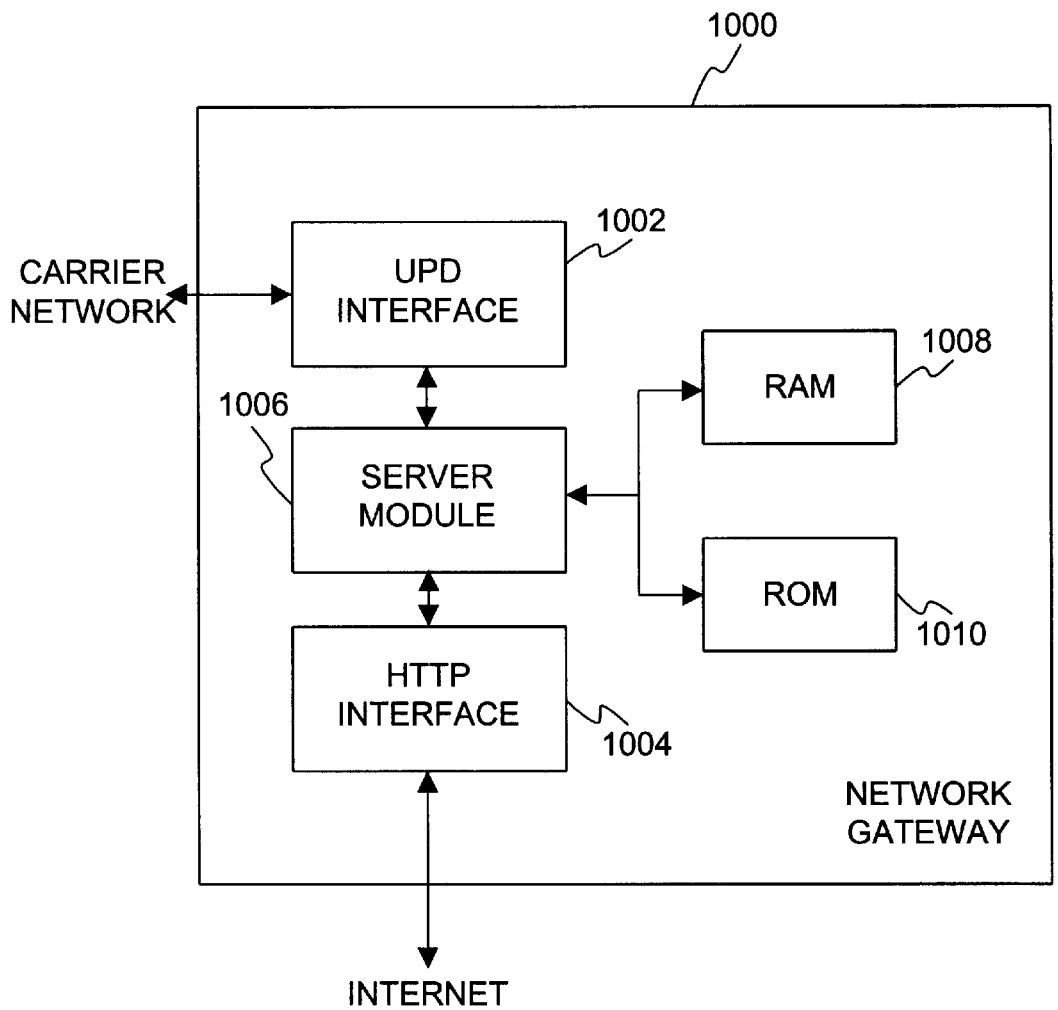
FIG. 10A is a block diagram of a network gateway suitable for use with the representative communication system illustrated in FIG. 9.

FIG. 10A is a block diagram of a network gateway 1000 suitable for use with the representative communication system 900 illustrated in FIG. 9. The network gateway 1000 can, for example, represent the network gateway 908 illustrated in FIG. 9 which is typically a server computer. To avoid obscuring aspects of the present invention, well known methods, procedures, components, and circuitry in the network gateway 1000 are not described in detail.

The network gateway 1000 includes a User Datagram Protocol (UDP) interface 1002 that couples to the carrier network 914, an HTTP interface 1004 that couples to the network 906, and a server module 1006 coupled between the UDP interface 1002 and the HTTP interface 1004. The server module 1006 performs traditional server processing pass as well as protocol conversion processing. In particular, the protocol conversion processing includes protocol conversion between UDP and HTTP. The server module 1006 also performs the processing associated secure sessions described above with respect to FIGS. 5 and 5. Further, to assist the server module 1006 in its processing, the proxy server 1000 includes a random access memory (RAM) 1008 and a read-only memory (ROM) 1010. Among other things, the RAM 1008 will store device identifiers, subscriber identifiers, configuration information, security information, and alias conversion information. In one embodiment, such information is stored in the RAM 1010 as a database. Also, the RAM 1010 can represent the account information storage area 910 illustrated in FIG. 9.

Figure 10B:
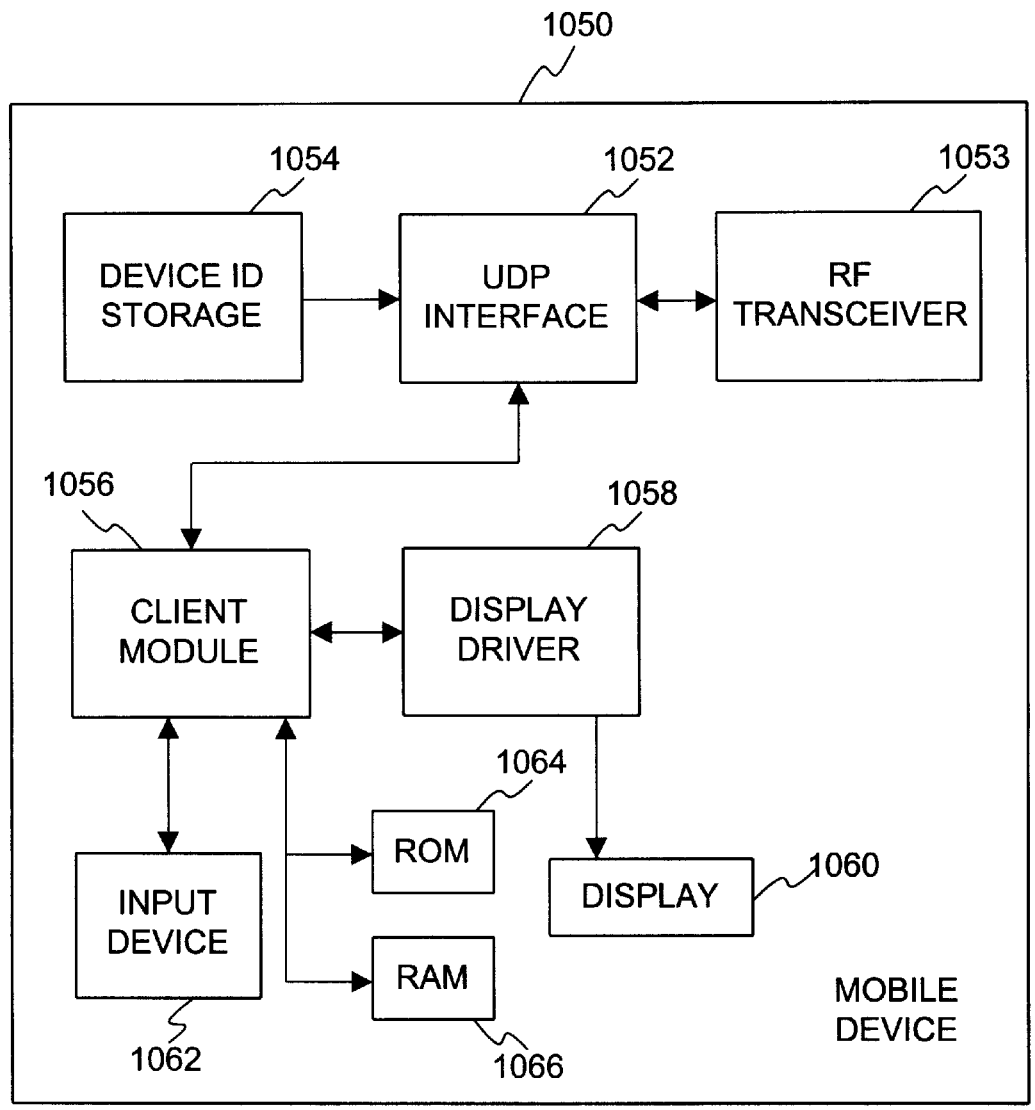
FIG. 10B is a block diagram of mobile device suitable for use with the representative communication system illustrated in FIG. 9.

FIG. 10B is a block diagram of mobile device 1050 suitable for use with the representative communication system 900 illustrated in FIG. 9. The mobile device 1050 can, for example, correspond to the remote computing device 918 that operates the remote wireless browser 916 illustrated in FIG. 9.

The mobile device 1050 includes a UDP interface 1052 that couples to the carrier network 914 via a RF transceiver 1053 to receive incoming and outgoing signals. A device identifier (ID) storage 1054 supplies a device ID to the UDP interface 1052. The device ID identifies a specific code that is associated with a particular mobile device 1050. In addition, the mobile device 1050 includes a client module 1056 that performs many of the processing tasks performed by the mobile device 1050 including establishing a communication session with the carrier network 1014 and the network gateway 908, requesting and receiving data (e.g., pages) from the network 906, displaying information on a display of the remote computing device, and receiving user input. The client module 1056 is coupled to the UDP interface 1052 for the establishment of a communication session and the requesting and receiving of data. The client module 1056 also performs the processing associated with the transmission and reception of the messages transmitted from the gateway computer 908, 1000, including the secure session processing described above with respect to FIGS. 4 and 7. The client module 1056 controls the display driver 1058 to display information on the display 1060 to the user. Additionally, the client module 1056 is coupled to an input device 1062, a ROM 1064, and a RAM 1066. Preferably, among other things, the client module 1056 operates a network browser, such as a Handheld Device Markup Language (HDML) web browser. The input device 1062 allows a user of the mobile device 1050 to input data and thus make selections in controlling and using the mobile device 1050. The ROM 1064 stores predetermined data and processing instructions for the client module 1056. The RAM 1066 is used to provide temporary data storage for security information as well as for incoming and outgoing data being received and transmitted.

Although embodiments of the network gateway 1000 and the mobile device 1050 described in FIGS. 10A and 10B using UDP and HTTP protocols, it should be recognized that other protocols and other protocol stacks can be provided and utilized. Additional details on the design and construction of the network gateway 1000 and the mobile device 1050 are contained in U.S. patent application Ser. No. 08/570,210 entitled "METHOD AND ARCHITECTURE FOR AN INTERACTIVE TWO-WAY DATA COMMUNICATION NETWORK" by Alain Rossmann, which is hereby incorporated by reference.

The advantages of the invention are numerous. Several advantages that embodiments of the invention may include are as follows. One advantage of the invention is that a secure connection can be established over a one-way channel. Another advantage of the invention is that the establishment of a secured connection can be rapidly achieved, thus improving the latency for such operations as compared to conventional approaches. Yet another advantage of the invention is that a server is provided with the option of additional secure data paths to a client (e.g., mobile device), whereby the server can use either or both of the paths depending on particular selection criteria including cost, speed and availability.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for securely transmitting data between a client and a server over a narrowband channel, where the client and server are connectable by not only the narrowband channel but also by a wideband channel, said method comprising the acts of:

connecting the client and server over the wideband channel;

exchanging security information between the client and server over the wideband channel;

encrypting data to be transmitted from the server to the client using the security information at the server; and transmitting the encrypted data from the server to the client over the narrowband channel.

2. A method as recited in claim 1, wherein said encrypting comprises:

forming a server-side narrowband channel key block based at least in part on the security information at the server; and encrypting the data to be transmitted from the server to the client using the server-side narrowband channel key block.

3. A method as recited in claim 2, wherein said method further comprises:

forming a client-side narrowband channel key block based at least in part on the security information at the client;

receiving the encrypted data that has been transmitted from the server to the client over the narrowband channel; and decrypting the encrypted data that has been received from the server over the narrowband channel.

4. A method as recited in claim 1, wherein said method further comprises:

transmitting different portions of the encrypted data from the server to the client over the narrowband channel and the wideband channel.

5. A method as recited in claim 4, wherein said encrypting comprises:

forming a server-side narrowband channel key block based at least in part on the security information at the server;

forming a server-side wideband channel key block based at least in part on the security information at the server;

encrypting the portion of the data to be transmitted from the server to the client over the narrowband channel using the server-side narrowband channel key block; and encrypting the portion of the data to be transmitted from the server to the client over the wideband channel using the server-side wideband channel key block.

6. A method as recited in claim 5, wherein said method further comprises:

forming a client-side narrowband channel key block based at least in part on the security information at the client;

forming a client-side wideband channel key block based at least in part on the security information at the client;

receiving the encrypted data that has been transmitted from the server to the client over the narrowband channel;

decrypting the encrypted data that has been received from the server over the narrowband channel using the client-side narrowband channel key block;

receiving the encrypted data that has been transmitted from the server to the client over the wideband channel; and decrypting the encrypted data that has been received from the server over the wideband channel using the client-side wideband channel key block.

7. A method as recited in claim 1, wherein said method further comprises:

encrypting data to be transmitted from the client to the server using the security information at the client; and transmitting the encrypted data from the client to the server over the narrowband channel.

8. A method as recited in claim 7, wherein said encrypting of the data to be transmitted from the client to the server comprises:

forming a client-side narrowband channel key block based at least in part on the security information at the client that was received over the wideband channel; and encrypting the data to be transmitted from the client to the server using the client-side narrowband channel key block.

9. A method as recited in claim 1, wherein at least a portion of the narrowband channel and the wideband channel are wireless.

10. A method as recited in claim 1, wherein the narrowband channel has a bandwidth less than one-half of the wideband channel.

11. A method as recited in claim 1, wherein the narrowband channel is a one-way channel, and the wideband channel is a two-way channel.

12. A method as recited in claim 1, wherein said method further comprises:

signing data to be transmitted from the server to the client based on the security information, and wherein said transmitting operates to transmits the encrypted data and the signed data from the server to the client over the narrowband channel.

13. A method as recited in claim 12, wherein the narrowband channel is a one-way channel, and the wideband channel is a two-way channel.

14. A method for transmitting data in a secure manner from a server to a client, said method comprising the acts of:

exchanging security information between the client and the server over a two-way channel between the client and the server;

encrypting data to be transmitted from the server to the client based on the security information; and transmitting the encrypted data from the server to the client over a one-way channel between the client and the server that carries data from the server to the client, wherein the two-way channel is a wideband channel, and the one-way channel is a narrowband channel.

15. A method as recited in claim 14, wherein the security information includes at least a key and a random number.

16. A method as recited in claim 14, wherein the security information further includes an identification of an encryption technique.

17. A method as recited in claim 14, wherein at least a portion of the narrowband channel and the wideband channel are wireless.

18. A method as recited in claim 17, wherein the wideband channel is provided by a circuit-switched data network, and the narrowband channel is provided by a one-way short message service network.

19. A method for securely transmitting data between a client and a server over a narrowband channel, where the client and server are connectable by not only the narrowband channel but also by a wideband channel, said method comprising the acts of:

connecting the client and server over the wideband channel;

exchanging security information between the client and server over the wideband channel;

signing data to be transmitted from the server to the client based on the security information, and transmitting the signed data from the server to the client over the narrowband channel.

20. A method as recited in claim 19, wherein at least a portion of the narrowband channel and the wideband channel are wireless.

21. A method as recited in claim 20, wherein the narrowband channel is a one-way channel, and the wideband channel is a two-way channel.

22. A wireless communication system, comprising:

a wired network having a plurality of server computers;

a wireless carrier network operatively connected to said wired network, said wireless carrier network supporting a narrowband channel and a wideband channel;

a network gateway coupled between said wired network and said wireless carrier network, said network gateway includes a secure connection processor that establishes a secure connection over the narrowband channel by exchanging security information over the wideband channel; and a plurality of wireless mobile devices that can exchange data with the server computers on said wired network via said wireless carrier network and said network gateway, wherein messages are supplied from said network gateway to said wireless mobile devices over the secure connection established over the narrowband channel.

23. A mobile device capable of connecting to a network of computers through a wireless link, said mobile device comprising:

a display screen that displays graphics and text;

a message buffer that temporarily stores a message from a computer on the network of computers, the message having a service identity associated therewith;

an application that utilizes the message received from the computer on the network of computers; and a cryptographic controller that controls encryption or signature of outgoing messages and controls the decryption or authentication of incoming messages, said cryptographic controller operates to establish a secure connection over which it receives the incoming messages by using a narrowband channel, wherein a companion wideband channel is used to exchange security information needed to establish the secure connection over the narrowband channel.

24. A mobile device as recited in claim 23, wherein said application is a browser application that permits a user to retrieve information from the computers on the network.

25. A computer readable medium including computer program code for securely transmitting data between a client and a server over a narrowband channel, where the client and server are connectable by not only the narrowband channel but also by a wideband channel, said computer readable medium comprises:

computer program code for connecting the client and server over the wideband channel;

computer program code for exchanging security information between the client and server over the wideband channel;

computer program code for cryptographically processing data to be transmitted using the security information; and computer program code for transmitting the cryptographically processed data from the server to the client over the narrowband channel.

26. A computer readable medium as recited in claim 25, wherein said computer program code for cryptographically processing comprises:

computer program code for forming a narrowband channel key block based at least in part on the security information; and computer program code for encrypting the data to be transmitted using the narrowband channel key block.

27. A computer readable medium as recited in claim 26, wherein said computer program code for cryptographically processing further comprises:

computer program code for signing data to be transmitted from the server to the client based on the security information.

28. A computer readable medium as recited in claim 26, wherein at least a portion of the narrowband channel and the wideband channel are wireless, and wherein the narrowband channel is a one-way channel, and the wideband channel is a two-way channel.

29. A computer readable medium including computer program code for transmitting data in a secure manner from a server to a client, said computer readable medium comprising:

computer program code for exchanging security information between the client and the server over a wireless, wideband channel between the client and the server;

computer program code for cryptographically processing data to be transmitted from the server to the client based on the security information; and computer program code for transmitting the cryptographically processed data from the server to the client over a wireless, narrowband channel between the client and the server that carries data from the server to the client.

30. A computer readable medium as recited in claim 29, wherein said computer program code for cryptographically processing the data to be transmitted performs at least one of encrypting and signing of the data.

31. A computer readable medium as recited in claim 29, wherein the wireless, wideband channel is a two-way channel, and the wireless, narrowband channel is a one-way channel.

32. A computer readable medium as recited in claim 31, wherein the wireless, wideband channel is provided by a circuit-switched data network, and the wireless, narrowband channel is provided by a one-way short message service network.

\* \* \* \* \*